Oct. 5, 1937.    L. L. CROSS    2,095,058
MOTORIZED VEHICLE CAB
Filed Jan. 8, 1937    2 Sheets-Sheet 1

INVENTOR.
LESTER L. CROSS
BY Louis Illmer
ATTORNEY.

Oct. 5, 1937.  L. L. CROSS  2,095,058

MOTORIZED VEHICLE CAB

Filed Jan. 8, 1937   2 Sheets-Sheet 2

INVENTOR.
LESTER L. CROSS
BY Louis Illmer
ATTORNEY.

Patented Oct. 5, 1937

2,095,058

UNITED STATES PATENT OFFICE 2,095,058

MOTORIZED VEHICLE CAB

Lester L. Cross, Cortland, N. Y., assignor to Brockway Motor Company, Inc., Cortland, N. Y., a corporation of New York Application January 8, 1937, Serial No. 119,602

11 Claims. (Cl. 180—64)

This invention relates to the art of body building for motorized vehicles and is primarily concerned with achieving a betterment in riding comfort for the driver where a comparatively massive multi-cylinder engine is compactly inbuilt into the cab confines of a heavy duty truck or van, also to provide adequate access facilities including an improved seat disposition by which to install or demount such a prime mover for the purpose of making major repairs requiring the removal of such power unit from its chassis framework.

My devices contemplate a single or centralized engine unit that is bridgingly mounted across a pair of offset frame channels in an improved manner by the use of interposed skid rails. An associated radiator or cooling system is installed at the forward end region of said engine; in its preferred exemplification, said system may comprise a pair of reversely pivoted, twin radiator assemblies respectively adapted to swing apart about their trunnions so as to unobstructedly allow a demounted engine to pass therebetween. In service, the normal clearance space allowed between such aligned radiator assemblies, is closed by a door or the like cover means. When the cover is opened, ready access is afforded to certain engine accessories in need of oiling, adjustment or minor repairs. The overall height of such twin radiators may be kept relatively low, which in turn allows of locating the bottom edge of the windshield nearer to the roadway level and thereby attain a corresponding wider line of vision for the seated driver as measured ahead of the front wheels, particularly in a direction over the longitudinal engine center-line.

Both such twin radiators are pipe interconnected with the engine jacket. A novel engine hood or removable conduit is employed to convey a forced current of air through the radiator cores and onward along the respective sides of the engine jacket for delivery exteriorly of the cab confines. If preferred, an equivalent centralized, single radiator core may likewise be mounted to tilt about trunnion means. In either event, said engine hood is herein wholly mounted interiorly of the cab confines and so arranged that a hood portion may be lifted to augment engine accessibility. When required, my demountable hood may also be bodily removed through either side door of the cab. The driver's seat is compactly installed alongside the engine to attain the maximum pay load space for a given wheel base, all without requiring this seat to be raised abnormally above the roadway level or rendering it uncomfortable in riding qualities because of excessive side sway effects.

The object of this invention is to provide for a relatively simple combined cab body and chassis structure of the character indicated that can readily be fabricated on a standardized productive basis at a corresponding low first cost, also to compactly incorporate the necessary control appurtenances appropriate to present purposes.

Further embodied herein are certain other novel structural features such as a relatively low floor and seat level, all of which will presently be more explicitly pointed out. Reference is had to the accompanying two sheets of drawings which are illustrative of certain exemplifications and in which drawings.

Figure 4:
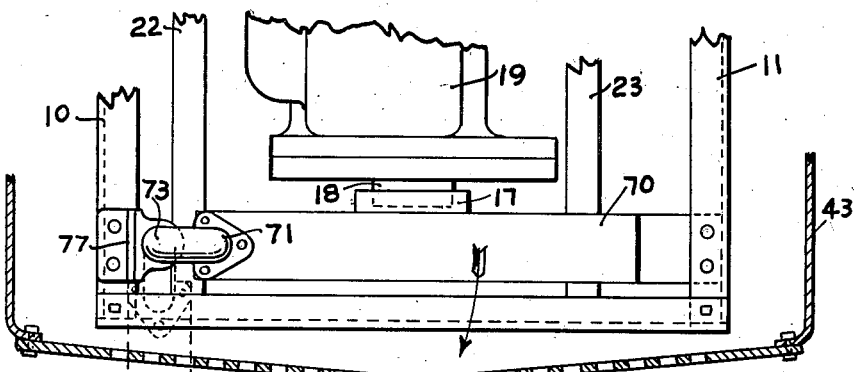
Figure 5:
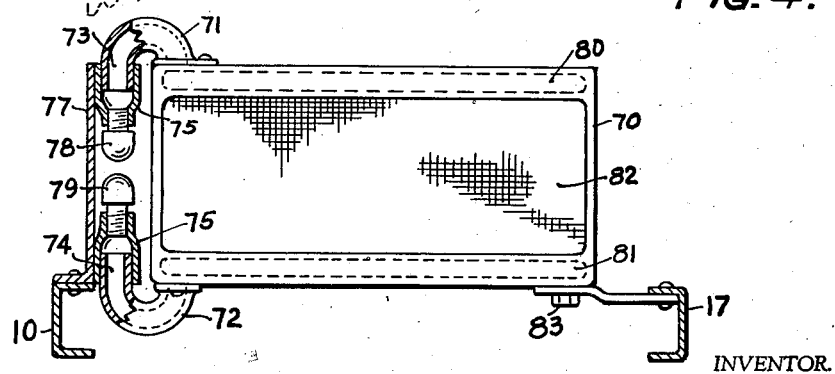

Figs. 4 and 5 respectively depict a modified style of pivotally mounted unitary radiator.

Figure 1:
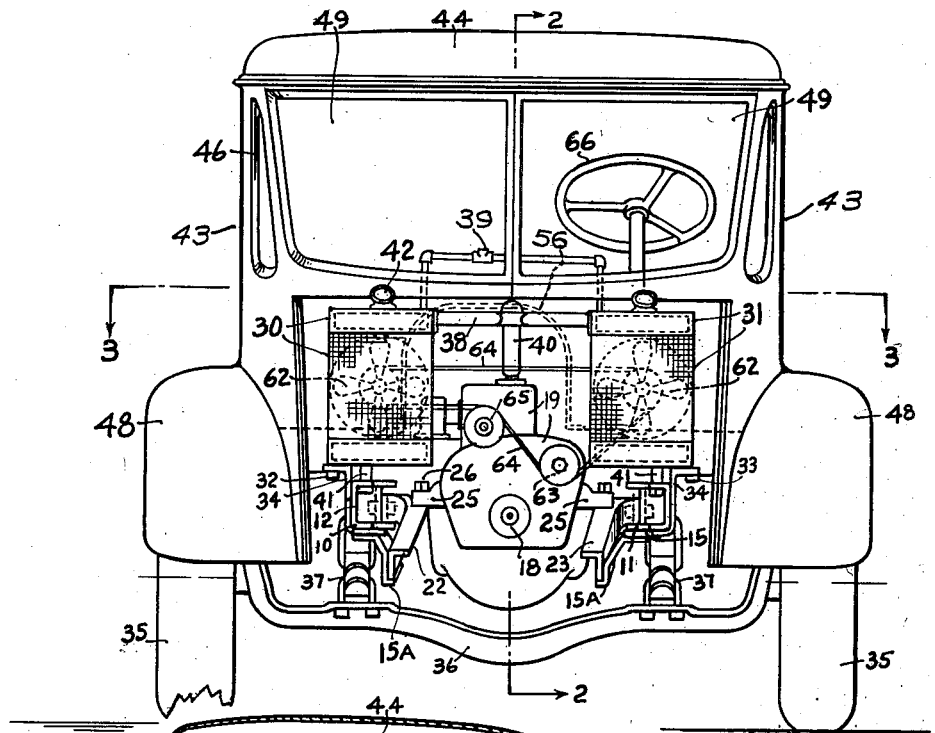
Fig. 1 is an elevational front view of a cab assembly equipped with my improvements but having the cross beam removed for clarity of illustration.
Figure 2:
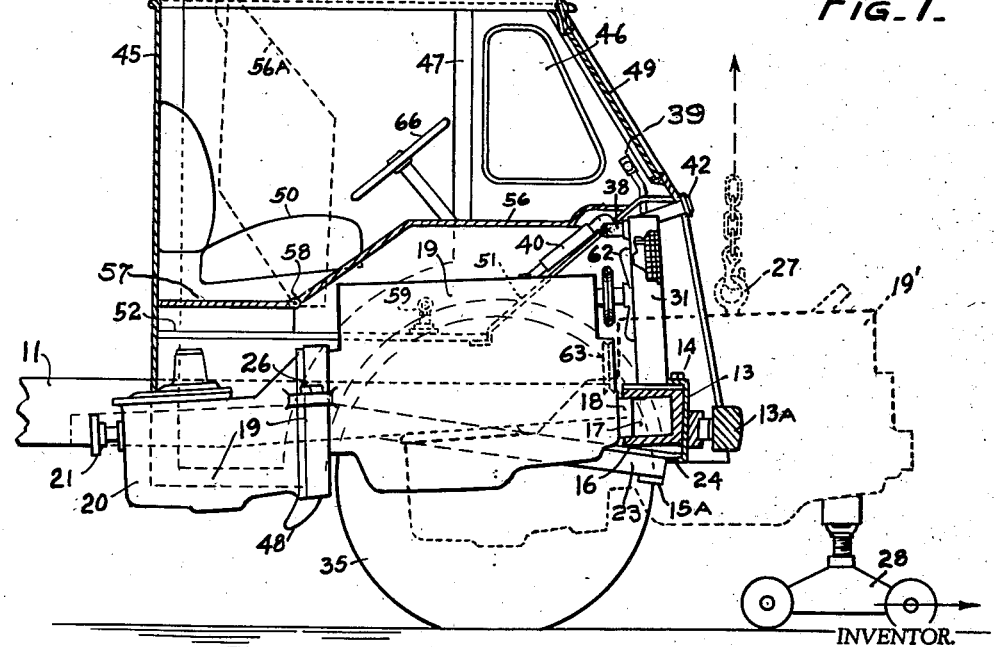
Fig. 2 represents a fragmental vertical view including the assembled cross beam as taken along the section line 2—2 of Fig. 1 with the engine and transmission thereof schematically indicated in perimetric outline.
Figure 3:
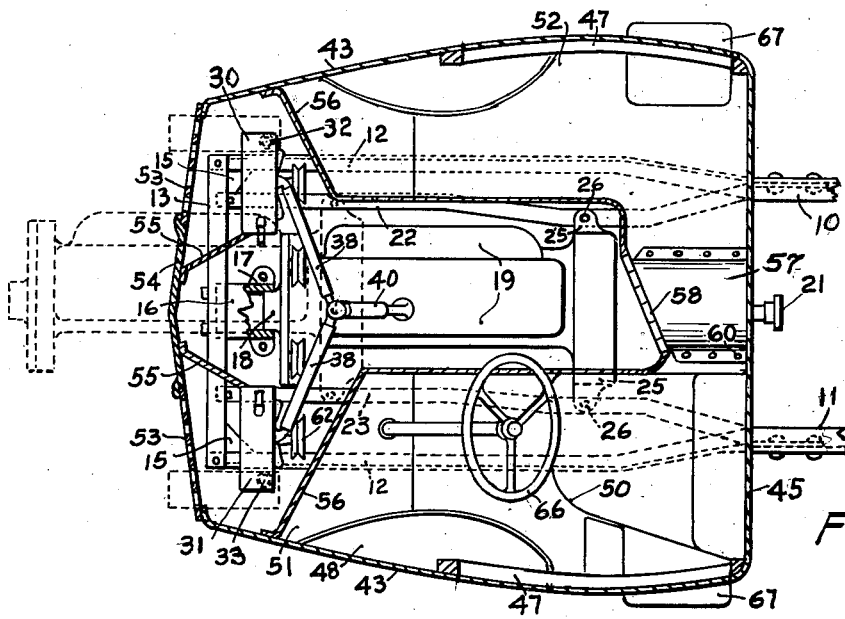
Fig. 3 shows a top view taken along the section line 3—3 of Fig. 1, the forward section of the engine hood being cross-sectionally shown in phantom outline.

Referring first to Figs. 1 to 3, this disclosure depicts a cab assembly adapted to have a truck or van body mounted therebehind on a common chassis in a conventional manner. The chassis framework preferably comprises a pair of cross-connected longitudinal beams or complementary side channels 10 and 11 of which the respective horizontal flanges are preferably faced inwardly. Only the forward end components of each such channel are shown and these may be laterally offset as at 12 to widen the normal spacing with respect to the corresponding channel extensions lying immediately rearward of my cab. The forward extremities of the respective longitudinal members 10 and 11 are herein bridged by a channeled cross beam 13 whose vertically disposed web may be made considerably deeper than those of said members, as indicated. The top flange 14 of the cross beam may overlie the aforesaid channel extremities in the Fig. 2 manner and the ends of such cross beam may be demountably secured in place and braced by the use of bolted gussets such as 15.

Said cross beam, intermediate its ends, supports a trunnion housing 16 that may be provided with a clamped circular socket 17. Said socket operatively receives a forwardly overhanging trunnion 18 carried by the single engine collectively designated as 19, and which motive unit may be inclusive of the attached transmission casing 20 and coupled propeller shaft 21. As shown in Fig. 3, the center-line of such shaft may in plan be located coincident with that of the chassis.

Interposed between the forward end components of my offset side channels, are mounted a pair of continuous angle iron skid rails such as 22 and 23 of which the respective forward terminals may be separately upheld by hanger-like shoes that depend from the gussets 15. Said laterally spaced rails are preferably but not necessarily inclined upwardly and rearwardly in substantial parallelism as in Fig. 2 and may have their respective deflected rear terminals rigidly attached to a contiguous side channel in the Fig. 3 manner. The installation of said skid rails is such that a considerable load may be borne thereacross in the event the cross beam should be removed. The front bumper 13A may be operatively carried by such beam.

Said centralized engine unit 19 is provided with the usual oppositely directed supporting arms such as 25 which are herein respectively bolted at 26 to each of said skid rails. In conjunction with the trunnion 18, these arms provide for a three point suspension or engine mounting. It will be observed that in contrast with conventional practice, said engine supports are here indirectly carried upon the side channels through their associated skid rails. After removing the arm bolts 26 and the cross beam 13, my engine unit 19 together with its attached transmission mechanism may be freely skidded forwardly along said rails into the dotted Fig. 2 position. Upon removing a suitable spark plug, a lifting eyebolt 27 may be screwed in its place. By resorting to a chain hoist and a floor carriage or jack 28, said engine unit may then be freely carried forwardly to wholly clear the side channels. After a general overhauling, the same or a substitute engine may be restored into place by a reversal of the described procedure, the socketed housing 17 being finally made to firmly center the engine trunnion 18 therein.

As intimated, a further intent is to compactly install my cab over such a demountable engine unit. To this end, I preferably resort to the twin radiator assemblies 30 and 31 of which the erected cellular core faces are normally mounted alongside the engine in a common transverse plane as indicated in Fig. 3. To provide for the necessary clearance that will permit of unobstructedly dragging the engine between these spaced core faces, each shell of my twin radiators may be swivelly mounted upon a separate pivot such as 32 or 33, respectively supported from a side channel by means of the raised brackets 34 and which radiators may be laterally braced by demountable stay rods (not shown). For certain purposes, my twin radiators may also be bodily demounted instead of turned about their respective pivots in order to clear the engine unit when skidded forwardly.

In this connection, it will be understood that the front wheels such as 35 may be interconnected in the usual manner by the drop axle 36 which mounts the side channels 10 and 11 through a pair of interposed suspension springs such as 37, these being alignedly hung directly beneath their respective offset frame portions 12 for maximum body stability.

Referring in further detail to the disposition of my twin radiators, the shells thereof may each be provided with a top and a bottom tank of which the mated top tanks may be cross-connected through the intake pipe 38 and respectively provided with centralized overflow piping means 39 of the gooseneck vent type as schematically indicated in Fig. 1 and the discharge of which overflow is kept elevated with respect to the top tanks. By virtue of such elevated vent, a tiltingly raised tank cannot be materially drained through the overflow of a relatively lowered tank should my chassis become steeply inclined while being parked alongside a curb. The branch pipe 40 may connect said intake pipe with the delivery outlet of the engine jacket. The mated bottom tanks of my radiator may be placed in communication with the suction side of a circulating pump (not shown), which accessory is commonly included in said engine unit 19. As an alternative, my twin radiators may also be pipe interconnected in series instead of parallel, in which event a similar type of vent or overflow conduit may be used to bring about a like result.

The several pipe connections may be broken at will by hose couplings to permit of freely swinging the respective radiators about their trunnions into substantial axial alignment with their side channels as represented by dotted outline in Fig. 3. When restored into their normal operative position, each such twin radiator may be secured in place by a lock bolt 41 or equivalent means. Each radiator unit is provided with a separate engine driven fan 62 preferably located centrally behind the core face thereof to swing in unison after its belt drive is disengaged. The use of twin fans more effectively serves the combined frontal area of the respective cores and allows of cutting down on the corresponding gross area with respect to a centralized radiator assembly. Furthermore, should one of my twin radiators become disabled, a truck so equipped is enabled to proceed to a service station by running on the other radiator.

Referring now to the more pertinent details embodied in my cab structure, this may comprise oppositely disposed side walls such as 43 having a deck 44 suspended thereacross, and also a rear closure wall 45. Each of said side walls may be equipped with an inset transparent panel 46 and with a side door 47 of which the offset forward jamb conforms to the shape of the front wheel mudguard or fender 48 as indicated in dotted doorway lines. A step 67 may be located at the door sill. Depending from the forward transverse edge of said deck, is a pair of relatively inclined windshield panes such as 49 of which the respective lower edges substantially align horizontally with the driver's seat 50. Beneath said windshield, the cab wall confines may be kept open and thereby admit air currents to both twin radiators, also to provide clearance space into which to swing said shells about their respective trunnions.

A removable toe board 51 inclines downwardly and rearwardly from the lower windshield edge toward the floor board 52, which latter may be upheld across the chassis side channels in any approved manner. The lower portion of such toe board and the forward portion of the floor board may respectively be bifurcated to neatly straddle the engine unit so as to provide clearance therearound. The front of such radiator installation may be trimmed in streamlined fashion by a sectionalized grillwork extending crosswise between the front fenders to comprise a pair of separately demountable perforated panels such as 53 having an imperforate door or cover member 54 interposed therebetween. Each vertical edge of said cover may be extended outwardly into a flexible wing 55 arranged to deflect a current of air through one such radiator core without substantial bypassing effects. A capped radiator filler spout 42 may extend through said grillwork.

Mounted above said floor board is a funnel shaped shroud or engine hood section 56 of which the contracted rear neck portion is shaped into a vent tunnel 57 to carry off the spent cooling air beneath the floor level. The forward transverse edge of said tunnel may be provided with a removable, obliquely disposed pintle 58 that hingedly mounts the major portion of my engine hood thereon. The forwardly diverging mouth end of said hood may be attached to the floor board 52 by latchable fasteners. The base of said tunnel may be flanged and removably bolted at 60 to said floor board. The flared hood mouth is arranged to house the radiator piping and collectively convey the inflow of air current from said twin cores and along both sides of the engine unit. The pintle 58 is so disposed that the forward hood end may be freely swung upwardly toward the deck 44 into its dotted raised position 56A and thereby afford convenient access to certain engine parts. After removing the hinge pintle 58, said hood may by dextrous manipulation, be carried through one side door 47 in the event a repair man should need still more cab room in which to work.

To permit of supporting my heavy duty engine upon the trunnion 18, I preferably operate the duplex radiator core fans such as 62 from a common drive pulley 63 mounted on the forward end of a suitably extended auxiliary cam or other engine shaft. A single endless belt 64 may be carried over both fan pulleys and an adjustable idler pulley 65 in the manner schematically indicated in Fig. 1. The fact that the frontal faces of such twin radiators may be inset some distance back of the forward end of the trunnion housing 16, materially shortens the overall power plant length and makes for a correspondingly lighter cab weight.

The removable driver's seat 50 is preferably offset wholly to one side of the hood tunnel in a symmetrical relation with the axial center of the steering wheel 66. A pair of conventional foot pedals, electric starter and the like accessory engine controls (not shown) are intended to form a part of the chassis equipment hereof. The obliquity given to the hood pintle 58 serves to shift the raised hood away from one seat end for augmented clearance purposes. The described engine installation is such that the cab floor level may be kept relatively low and beneath the top of the engine. The height of the seat 50 is correspondingly lowered within easy reach to obviate abnormal fatigue on part of the cab driver without having to frequently climb steep ladderlike steps in making house to house deliveries. An important aim is to reduce the need for such stairs since they are likely to become slippery in inclement weather and lead to personal injury. A further desirable attribute of a lowered seat level resides in smoother and more comfortable riding qualities free from excessive body sway, particularly for long distance hauling purposes.

A difficulty heretofore encountered with a corresponding low seat disposition, is the lack of clear roadway vision, especially in a direction closely ahead of the front wheels. Such deficiency is herein solved by the installation of twin radiators which can be held within a materially lower height for a given frontal core area than when centralized into a single cooling unit. As a further advantage, my motive unit may readily be demounted along rail skids between such swivel mounted twin radiators without requiring either core shell to be bodily displaced.

In addition, adequate access is afforded by virtue of the removable cover 54, through which to service the forward portion of a compactly installed engine. A latched hood, when raised within the cab confines, provides convenient access to the rear portion of my motive unit without requiring the removal of the aforesaid cover member. As herein arranged, the duplex radiator fans are driven from a common lay shaft pulley, which in turn allows of mounting a relatively long engine on a yieldable three point suspension principle adapted to properly counteract chassis weave.

As a modification, the use of a single radiator of the swivel type is disclosed in Figs. 4 and 5. Here a relatively low core and tank installation is schematically represented, which in certain instances may be substituted in lieu of the foregoing twin radiators. In such event, this centralized radiator assembly may similarly be located forwardly of the engine. The opposite ends of one vertical edge region of the unitary radiator shell 70 may respectively be equipped with flanged tubular fixtures 71 and 72 of which the hollow overhanging trunnions 73 and 74 may be reversely arranged in common axial alignment. A socket fitting such as 75 cooperates with each trunnion and may be packed against leakage by any appropriate means. These fittings are shown rigidly supported by a stanchion 77. The socketed chambers of said fittings respectively connect with water feed pipes 78 and 79, which in turn communicate with the upper and lower radiator tanks 80 and 81. Interposed therebetween is a cellular radiator core 82 of the conventional type.

My trunnion disposition is such that by a loosening of the locking bolt 83, this single radiator assembly may be swung forwardly about its trunnions without requiring a complete dismantling of said feed pipe connections. The engine unit is then allowed to unobstructedly skid along rails such as 22 and 23 of the kind that have previously been explicitly set forth. It will be obvious that similar complementary trunnion fixtures may likewise be applied to the twin radiator assemblies 30 and 31.

The foregoing disclosures are thought to make apparent to those skilled in this art, the outstanding advantages afforded by my improved body and chassis structure, it being understood that various changes in the illustrative embodiment thereof may be resorted to, all without departing from the spirit and scope of my invention heretofore described and more particularly pointed out in the appended claims.

I claim:

1. In a motorized vehicle, the combination of a chassis framework comprising laterally spaced side members disposed longitudinally, each such member having an offset in its forward length portion arranged to augment the lateral spacing thereof with respect to a medial portion of the members, mated skid rail means interposed lengthwise between the offset forward length portions of said side members, each such rail means including a rear length component secured to a different side member and a length component that extends forwardly therefrom, a motive unit bridgingly mounted across said skid rails and which unit is bodily shiftable lengthwise thereof, a front axle spanning the offset forward length portions of the respective side members, and a separate suspension leaf spring interposed between each such side member and the front axle, said springs being respectively hung beneath and in substantial registry with a different forward length portion of the side members.

2. In a motorized vehicle, the combination of a chassis framework comprising laterally spaced side members extending longitudinally, mated skid rails interposed lengthwise between said side members, a pair of spaced radiator cores carried by the chassis and respectively mounted in a straddled relation to a center-line located between said rails, means pivotally upholding each such radiator core for swinging movement toward or away from said center-line, and a motive unit bridgingly mounted across the skid rails behind said cores, said unit for demounting purposes being shiftable along the mated rails to pass forwardly between the radiator cores when the latter are swung outwardly away from such center-line.

3. In a motorized vehicle, the combination of a chassis framework comprising laterally spaced side members extending longitudinally, mated skid rails interposed lengthwise between said members, a jacketed engine mounted across and shiftable along said skid rails, a radiator core cooperating with the engine for cooling purposes and which core has an erect frontal face disposed ahead of the engine in a normally transverse relationship to a center-line located between said rails, means pivotally upholding said radiator core upon the framework to permit said frontal face to be swung out of its normal transverse relationship whereby the engine may be bodily skidded forwardly along the rails without interference with said core.

4. In a motorized vehicle, the combination of a chassis framework comprising laterally spaced side members extending longitudinally, mated skid rails interposed lengthwise between said members, a jacketed engine mounted across and shiftable along said skid rails, spaced twin radiator cores arranged oppositely with respect to a center-line located between said rails and which cores are respectively provided with an erect frontal face that substantially align ahead of the engine when said cores are operatively connected to cool the jacketed engine, means upholding each such radiator core with respect to said framework and allowing the engine to be unobstructedly shifted forwardly along said skid rails.

5. In a motorized vehicle, the combination of a chassis framework comprising laterally spaced side members extending longitudinally, mated skid rails interposed lengthwise between said members, a jacketed engine mounted across and shiftable along said skid rails, spaced twin radiator cores disposed oppositely with respect to a center-line located between said rails, said cores being respectively provided with an upper and a lower tank having an erect frontal face therebetween and which faces are normally aligned ahead of the engine, means upholding each such radiator core with respect to said framework and allowing the engine to be unobstructedly shifted forwardly along said skid rails, and conduit means operatively interconnecting certain radiator tanks and which conduit is equipped with centralized vent means.

6. In a motorized vehicle, the combination of a chassis framework comprising laterally spaced side members disposed longitudinally, a jacketed reciprocative engine mounted across said side members with its crankshaft center-line extending lengthwise of the side members, a cooperating radiator core provided with an upper and a lower tank having an erect frontal face therebetween that is located forwardly of the installed engine in a normally transverse relation to said center-line, complementary tubular trunnion means that are axially aligned and serve to pivotally uphold said core upon the framework, said trunnions being respectively arranged to communicate with a different tank, and conduit means interconnecting the respective trunnion means with the engine jacket, said core being rotatable about its trunnions while said conduit is interconnected.

7. In a motorized vehicle, the combination of a chassis framework comprising a pair of laterally spaced side members extending longitudinally, mated skid rails interposed lengthwise between said members, a single engine mounted across and shiftable along said rails, twin radiator cores operatively associated with said engine and disposed oppositely with respect to a center-line located between said rails, said cores being respectively provided with an erect frontal face which normally align ahead of the engine and have a clearance spacing therebetween that is smaller than the overall engine width, separate pivotal means rotatably upholding each such radiator core with respect to said framework, and a body structure housing the engine and both cores, said structure including a deck and a windshield depending therefrom of which its lower transverse edge terminates above the respective cores to leave an open space beneath said windshield edge into which to unobstructedly swing the respective cores forwardly about their pivots for engine demounting purposes.

8. In a motorized vehicle, the combination of a chassis framework comprising laterally spaced side members extending longitudinally, mated skid rails interposed lengthwise between said members, a single fluid cooled engine mounted across and shiftable along said rails, twin radiator cores operatively associated with said engine and disposed oppositely with respect to a center-line located between said rails, said cores being respectively provided with an erect frontal face which when operatively positioned stand in substantial alignment forwardly of the installed engine unit and have a clearance space between said faces that is smaller than the overall engine width, means upholding each such radiator core with respect to said framework and permitting the engine to be unobstructedly shifted forwardly, a body structure housing the engine and both cores, said structure including a deck and a windshield depending therefrom of which the lower transverse edge leaves an opening therebeneath, and a cover agency closing a portion of said opening whereby to gain access to the installed engine through the aforesaid clearance space.

9. In a motorized vehicle, the combination of a chassis framework comprising laterally spaced side members extending longitudinally, mated skid rails interposed lengthwise between said members, a single fluid cooled engine mounted across and shiftable along said rails, twin radiator cores cooperatively associated with said engine and disposed oppositely with respect to a center-line located between said rails, separate pivotal means rotatably upholding each such radiator core with respect to said framework, a body structure housing the engine and both cores, said structure including a deck and a windshield depending therefrom of which the lower transverse edge terminates above the respective cores to leave an open space beneath said windshield edge into which to swing the respective cores about their pivots, a floor board sustained by the side members, a toe board extending between the floor board and the aforesaid windshield edge, and a sectional engine hood inbuilt within the body structure, said hood comprising a tunnel-like vent component mounted upon the floor board and having hingedly connected thereto a flared component of which the free end swings toward or away from the toe board, the pintle of said hinge connection being axially inclined with respect to the aforesaid center-line.

10. In a motorized vehicle, the combination of a chassis framework comprising laterally spaced side members extending longitudinally, mated skid rails interposed lengthwise between said members, a unitary engine and tandem transmission housing mounted across and shiftable along said rails, twin radiator assemblies respectively including a substantially rectangular shell together with an upright frontal core face and which radiators are cooperatively associated with said engine, separate pivotal means rotatably upholding the lower edge of each such radiator shell in a horizontal relation to said framework, the respective overall shell heights being kept comparatively low for a given frontal face area, a floor board sustained directly over said transmission housing and beneath the top level of the engine, and a transverse driver's seat mounted upon the floor board, the forward seat edge being disposed in substantial planiform alignment with the respective top edges of the twin radiator shells.

11. In a motorized vehicle, the combination of a chassis framework comprising laterally spaced side members extending longitudinally, mated skid rails interposed lengthwise between said members, a jacketed multi-cylinder engine provided with driven lay shaft pulley means located forwardly of the leading cylinder, the respective engine cylinders as a unit being mounted lengthwise between and shiftable along said rails for engine demounting purposes, twin radiator cores cooperatively associated with the engine jacket and disposed oppositely with respect to a center-line located between said rails, said cores being respectively provided with an erect frontal face, a rotatable fan disposed behind each such core, separate pivotal means upholding each such radiator core with respect to the framework whereby each such core together with its fan may be independently swung about the pivotal means thereof, and means for actuating both fans from the aforesaid driven pulley means when the frontal faces are swung into substantial parallelism.

LESTER L. CROSS.